INVENTORS
EULALIA C. HENDERSON
GEORGE STALLARD
BY George B. White
ATTORNEY.

April 11, 1944.　　　E. C. HENDERSON ET AL　　　2,346,304
AVIATION LANDING FIELD
Filed May 20, 1940　　　3 Sheets-Sheet 2
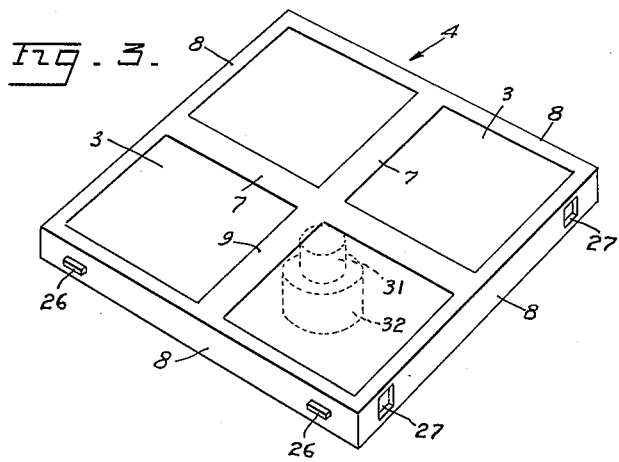
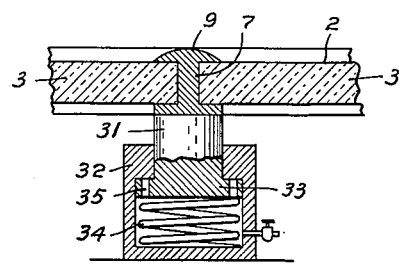
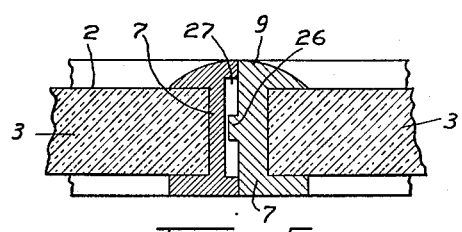
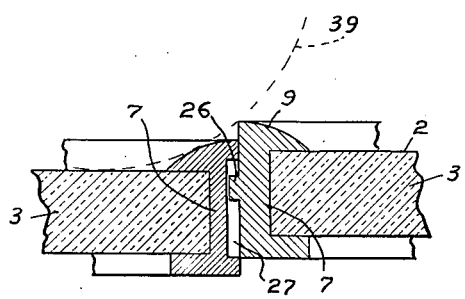
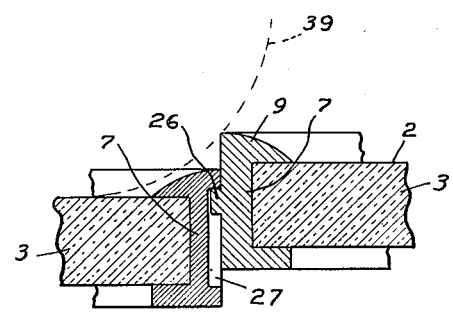
INVENTORS
EULALIA C. HENDERSON
GEORGE STALLARD
BY George B. White
ATTORNEY.

April 11, 1944.  E. C. HENDERSON ET AL  2,346,304
AVIATION LANDING FIELD
Filed May 20, 1940  3 Sheets-Sheet 3
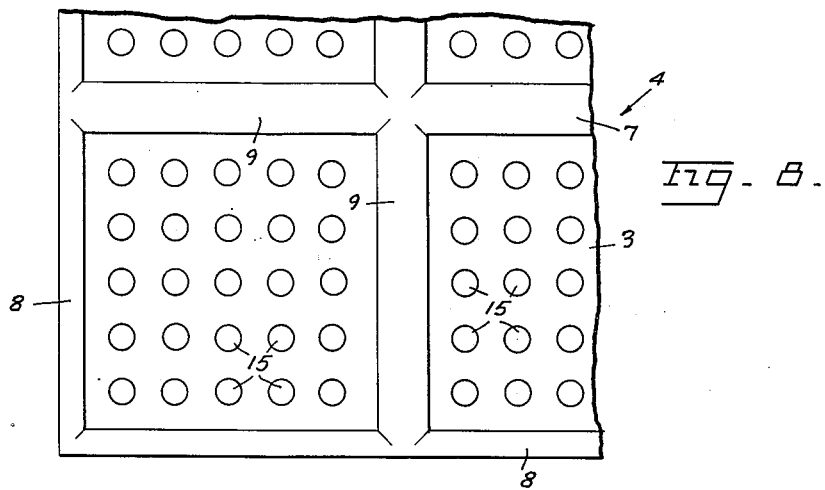
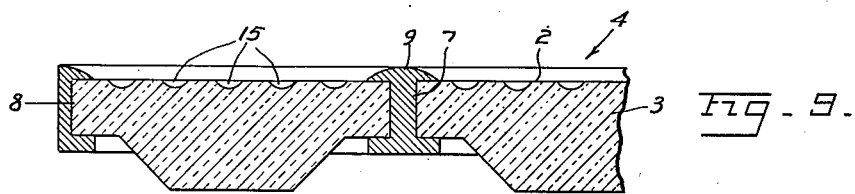
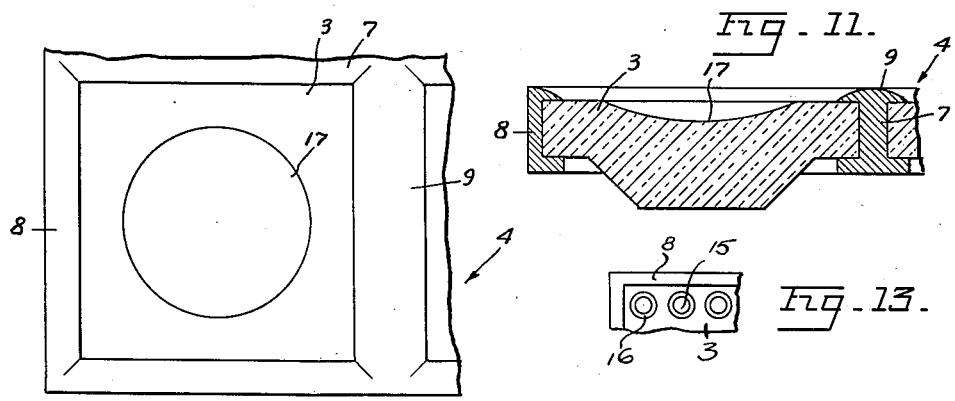
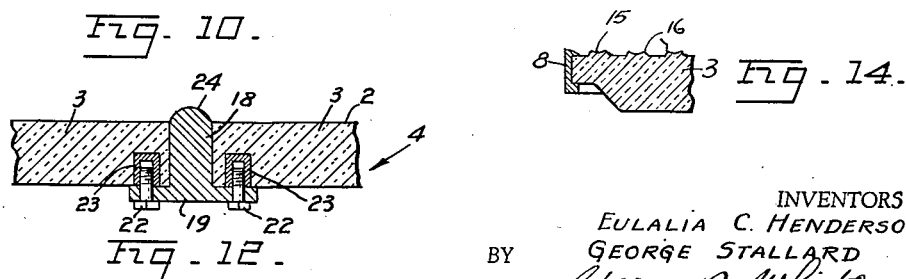
INVENTORS
EULALIA C. HENDERSON
GEORGE STALLARD
BY George B. White
ATTORNEY.

Patented Apr. 11, 1944

2,346,304

UNITED STATES PATENT OFFICE 2,346,304

AVIATION LANDING FIELD

Eulalia C. Henderson and George Stallard,
San Francisco, Calif.

Application May 20, 1940, Serial No. 336,104

15 Claims. (Cl. 244—114)

This invention relates to airfields.

Illumination of airfields heretofore involved overhead system of flood lights which require superstructures projecting above the level of the landing field. This spot light or flood light system is not uniform and sometimes it causes blinding glare, and has many other disadvantages. In order to increase the confidence of passengers of air liners, as well as to facilitate the observation of the exact landing surface by the pilot, especially during instruction of pilots, as one feature of our invention herein we provide an illuminated landing surface for airfields which entirely obviates the use of any superstructure or any parts in any way projecting above the level of the landing surface.

An object of this invention is to provide an illuminated landing field which is not glaring yet clearly defines and renders uniformly visible every part of the landing surface, by directing the light rays from beneath the landing level to a surface which is adapted to transmit the rays of light.

Another object of this invention is to provide a translucent or transparent landing surface on the airfield which is illuminated from below the surface, and which is made up of such sections as to obviate the danger of breakage or overstrain.

Another object of this invention is to provide a translucent or transparent landing surface which has means thereon to prevent skidding.

Another object of this invention is to provide a sectional landing surface for air fields wherein the sections are resiliently yieldable relatively to each other in proportion to the weight or landing force of landing aircraft.

Another object of this invention is to provide a landing surface for airfields which is readily observable throughout the entire landing operation without any glare, which is adapted to cushion the landing of an aircraft, and which is provided with abutments and elements to prevent skidding over the surface.

Other objects of the invention are to provide a device of the character described that will be superior in point of simplicity, inexpensiveness of construction, positiveness of operation, and facility and convenience in use and general efficiency.

In this specification, and the annexed drawings, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

With the foregoing and other objects in view, which will be made manifest in the following detailed description, reference is had to the accompanying drawings for the illustrative embodiment of the invention, wherein:

Fig. 3 is a perspective detail view of a section of panels in the frame for said surface.

Fig. 4 is a sectional view showing the cushion support for the landing surface sections.

Fig. 5 is a fragmental sectional view of the joining edges of adjacent sections of the landing surface.

Fig. 6 is a fragmental, sectional view of said section edges showing one section partly depressed.

Fig. 7 is a fragmental sectional view of said section edges, showing one section fully depressed and in position to pull the next section down.

Fig. 8 is a fragmental plan view of a section of the landing surface.

Fig. 9 is a fragmental, sectional view of the section of the landing surface with indents thereon.

Fig. 10 is a fragmental plan view of a section with concave panel surface.

Fig. 11 is a fragmental sectional view of sections with concave panel surface, and Fig. 12 is a fragmental sectional view of a modified construction of the surface section with removable panels.

Fig. 13 is a fragmental sectional view of a modified form of panel surface, and

Fig. 14 is a fragmental plan view of said modified form.

Figure 1:
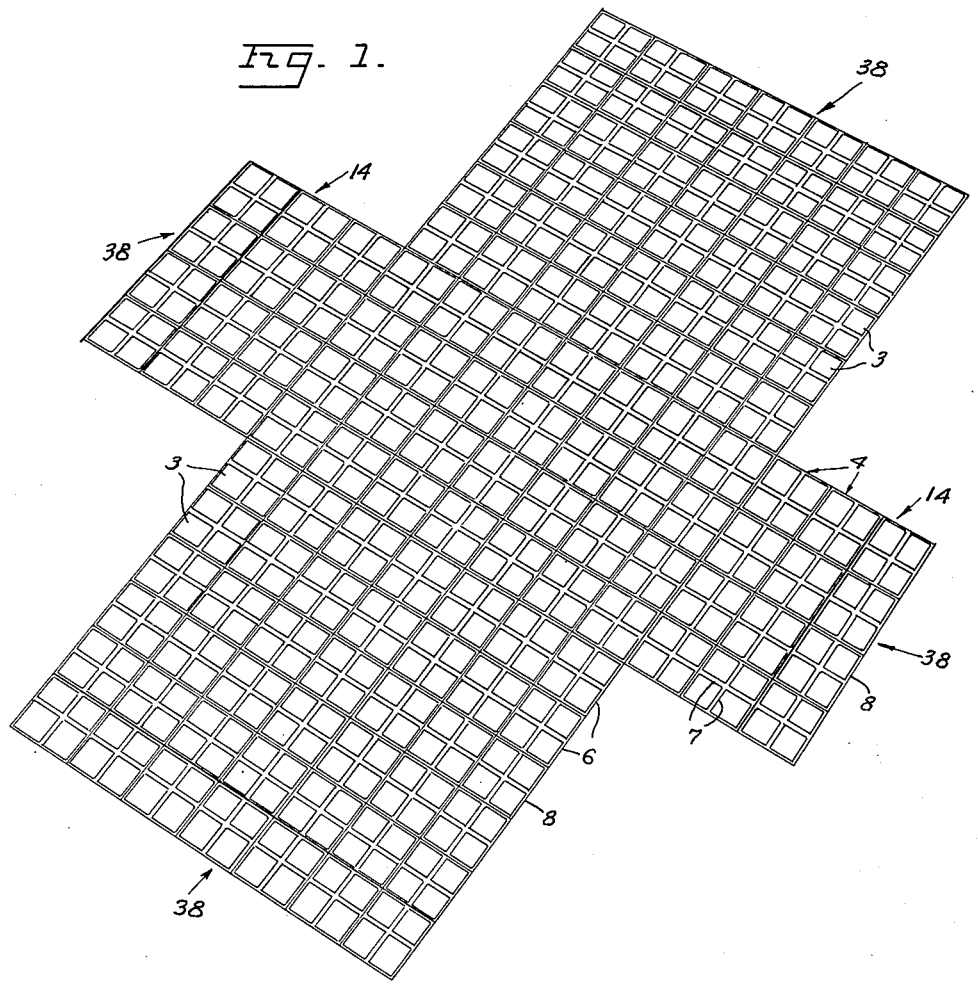
Fig. 1 is a perspective, somewhat diagrammatic view, of the landing surface construed in accordance with our invention.
Figure 2:
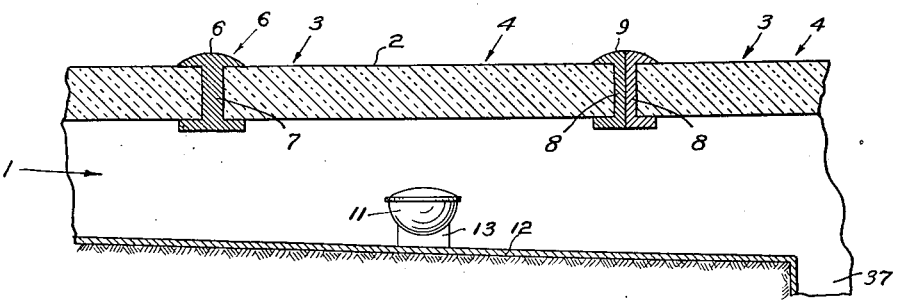
Fig. 2 is a fragmental sectional view of the landing surface construction.

In its general organization our invention includes a chamber 1 in the ground of the landing field, a landing surface 2 forming its cover, and means to illuminate the landing surface from below the level of landing. The chamber 1 is a large pit under the level of the landing field and corresponds substantially to the area of the landing surface 2, which latter is located at the level of the landing field. The landing surface 2 is formed by rows of panels 3 preferably made of transparent or translucent material. In the preferred embodiment herein the panels 3 are made of Lucite which is a strong material adapted to transmit light, although the panels 3 may be made of other suitable materials which transmit light and are of sufficient strength to withstand the force and weight of landing aircrafts.

The panels 3 are supported in suitable frames. In the herein illustration the landing surface 2 is made of separate sections, denoted by the reference numeral 4. Each section 4 includes four panels 3 securely fixed within a unitary frame 6 which latter is preferably made of metal or the like firm material. These sections 4 are connected to each other in series in both directions of the landing surface 2.

Each section 4 is made of intersecting rails 7 and border rails 8, which latter are vertically complemental halves of adjacent border rails 8 of the next section 4 when assembled in place. The respective panels 3 are held in suitable recesses in the rails 7 and 8. These rails 7 and 8 are suitably united so as to form a solid unit in each section 4. The top edges of the rails 7 and 8 protrude above the level of the top surface of the panels 3 and are preferably rounded so as to form ridges or bumpers 9 for the prevention of skidding of the aircraft on the landing surface 2.

Suitable sources of light, such as reflector lights 11 are mounted on the bottom 12 of the chamber 1 on suitable brackets 13. The entire shape of the landing surface herein is elongated in the form of a runway and it has transversely extended areas 14 to provide transverse runway indications. The sections 4 may be arranged at any desired angle to the direction of the runways, although in the herein illustration the sections 4 are in series substantially parallel and at right angles to the respective runways.

In detail each panel 3 may have its upper surface so treated as to reduce skidding to a minimum. For instance in the form shown in Figures 8 and 9 the top surface of the panel 3 is provided with a plurality of substantially semispherical indentations or concave cups 15, which serve as surface rougheners, and also as reflectors and refractors. These concave cups 15 are also of such dimensions that as the wheels of the usual landing gears of the aircraft roll over them the tires in pressing into the cups 15 expel the air and thus the cups 15 function as suction cups and retard the motion thereover as well as prevent skidding. A rim 16 of each cup 15 may protrude upwardly for further roughening as shown in Fig. 13. The upper face of each panel 3 may be dished to form a concave contact surface 17 as shown in Figures 10 and 11, which also operates both for the diffusion of the light rays and the retarding of movement over the surface.

In Fig. 12 we show another manner of mounting the panels 3. In this kind of mounting the individual panels 3 are also removable from the rails 18. The base flanges 19 of the rails 18 are provided with bolt holes 21 through which bolts 22 can be inserted from beneath the landing surface. These bolts 22 fit into suitable bushings 23 or the like cast or otherwise fastened into the bottom of the panel 3. The bolts 23 hold the panels 3 in place on the rails 18 so that any panel 3 may be readily interchanged or replaced. The top edges 24 of these rails 18 protrude above the level of the panel 23 and act as bumpers or ridges.

The panel sections 4 are supported with freedom of yieldable movement relatively to each other. The border rails 8 of each frame 6 have alternately tongues 26 and retaining grooves 27 which respectively interlock with the matching grooves 27 and tongues 26 of the adjacent border rails 8 of the next section 4. In the herein form two opposite side rails 8 of the frame 6 are provided each with a pair of spaced tongues 26, and the other two side rails 8 have the corresponding grooves 27 thereon. The tongues 26 are narrower than the width of the grooves 27 so that substantial space is left for vertical displacement of the sections 4 relatively to each other before one section 4 affects the next. After a section 4 is displaced by the landing force so far that its tongues 26 engage the grooves 27 of the next sections and vice versa then the next section 4 is moved thereby in the same direction. This action cushions the landing force as well as temporarily increases the height of the bumpers in accordance with the landing force or weight of aircrafts to prevent skidding and to slow the motion of the wheels of the aircraft. As a result the landing is dampened and crystallization is prevented.

The sections 4 are supported on cushioned posts 31. In the herein form there is a post 31. In this illustration there is such a post 31 connected to the intersection of each pair of cross rails 7. The post 31 telescopes into a cylinder 32 and an enlarged head 33 thereof bears against a coil spring 34. The cylinder 32 also contains a predetermined amount of fluid or rubber or air pressure to further dampen the cushioning action. For instance in this illustration fluid dampener is used, and for this purpose the post head 33 is perforated at 35 to provide a by-pass during the reciprocation of the post 31. Thus each section 4 is separately cushioned and is vertically movable to a limited degree before it pulls the next adjacent section 4 with it.

The walls of the cavity of the chamber 1 are preferably lined with a non-corrosive reflecting wall surface, such as Monel-metal or the like, to maintain uniform light reflection. The bottom 12 of the chamber 1 slopes toward a sump end 36 for automatically draining all moisture from the chamber 1 into a suitable sump 37. A suitable pump may be used to force the water from the sump either to a usual discharge or into a system of conduits with suitable nozzles to be used for cleaning the landing surface 2. The cleaning of the surface may be further facilitated by forcing air through the same nozzles.

Vapor light, incandescent light, or neon light, or any suitable light may be used for illumination purposes. It is preferable to have an amber light, or a non-glare so called sodium light, for illumination so that the same is visible at a distance without any increased glare upon approach to the landing surface 2. Each end zone 38 of each runway is provided with a system of signal lights of different colors which may be controlled by an operator such as the field dispatcher to indicate landing conditions, for instance the direction of wind, other ship on ground and the like. Each end zone 38 may have a set of green and red lights, the green lights indicating the end from which direction an aircraft should land according to prevailing wind direction. In the zone 38 at the approach end of the field the green lights are lighted and at the opposite end zone the red lights. Thus a system of indications can be established. All the panels 3 are made of reasonable size and the lights are of such character as to take care of visibility in fog and the like.

In some instances the cushioning effect is adjusted according to the approximate force anticipated on the landing surface 2 at various portions. For instance if the practice is to land near an end of the runway, then the strength and tension of the cushion springs 24, or the dampening fluid pressure in the cylinders 32 is gradually increased or stiffened toward the ends of the runways. This prevents excessive cushioning or springiness at the actual landing points. The relative portions of adjacent sections 4 under varying conditions of operation is illustrated in Figures 5, 6, and 7. In Fig. 5 the sections 4 are aligned on the same level. In Fig. 6, one section is partly depressed by a wheel 39 indicated in broken lines. The bumper 9 at the edge is thus relatively heightened. In Fig. 7 the first section 4 is fully depressed to the limit where it begins to displace the next section 4 with it and the relative height of the bumper 9 is here the highest.

The landing field herein described is superior to landing fields heretofore used in that it provides a positive and non-glare indication of the actual landing area with uniform illumination at the landing level and without overhead structure. The feature of sectional landing field with removable panels permits the quick replacement of the landing area in good condition in case of damaged air fields. The cushioning of the airfield reduces the danger of landings and eliminates the attendant inconvenience and danger. The movability of sections of the air field relatively to the other sections under the weight of aircraft of landing force allows such cushioning. The landing surface retards the plane at landing and prevents skidding by its ridges or bumpers and suction surfaces, and the ridges or bumpers vary in accordance with the landing force or weight placed upon them so that the roughening is substantially proportionated to the force to be resisted. The reflection of the illumination is substantially constant evenly diffused over the landing surface and the changeability of lights for signalling purposes adds to safety of the landing surface herein. This landing surface combines safe illumination with comparatively light weight and sensitivity of reaction to landing loads, with a ruggedness of construction and positiveness of operation especially adapting it for its use.

It is to be further noted that the landing surface 2 is also heated by the lights from below, and that if necessary other usual and suitable heating means may be provided within the chamber 1. This renders the invention also desirable for landing fields in climates where snow or ice forms on the landing field. The said heating action of the chamber 1 or the like melts the snow or ice and this action in combination with the bumpers and devices heretofore described prevents skidding and facilitates safe landing in any weather. The chamber 1 may be suitably air conditioned in any usual manner.

We claim:

1. In an aviation landing field, an illuminated surface comprising a plurality of solid transparent panels, means to illuminate said panels, each of said panels being movable relatively to the others, connecting means between adjacent panels to guide said relative movement of said panels and to transfer movement after a predetermined movement of one panel to the adjacent panels, yieldable support for said panels, and means on said panels to resist skidding of the aircraft on the transparent surfaces of the panels.

2. In an aviation landing field, a landing surface formed of a plurality of separate sections, means to support the sections so that each section is separately movable vertically with respect to the other, and means to limit said separate relative movement of the respective sections.

3. In an aviation landing field, a landing area comprising a plurality of movable sections arranged side by side to form the landing area, each of said sections being movable relatively to the other sections under the weight of an aircraft thereon, connecting means between adjacent sections to guide the relative movement of adjacent sections in a substantially vertical direction, the adjacent edges of said sections protruding above the level of said surface and forming ridges for retarding the movement of the aircraft over said surface, and resiliently yieldable means normally to support said sections at the same level.

4. In an aviation landing field, a plurality of separate panels arranged in series to form a landing field, resiliently yieldable means to hold the panels in position, frames on the respective panels, connecting means between adjacent frames to guide the movement of the respective frames and panels vertically relative to each other, and means on said connecting means to transfer movement of one frame to the adjacent frames after a limited vertical movement of said first frame.

5. In an aviation landing field, a plurality of separate sections forming the landing surface, means to yieldably support said sections, said sections being so connected to each other as to permit the individual depression of a section by the weight of a landing aircraft thereby to move said section relatively to the adjacent sections.

6. In an aviation landing field a plurality of separate frames arranged in series to form a landing field, a plurality of solid panels adapted to be illuminated from beneath the field being held in each frame, resiliently yieldable means to support said frames so that each frame is individually and vertically movable, a source of light beneath said frame to illuminate said panels, and connecting means between adjacent frames to limit the movement of each frame relatively to the adjacent frames.

7. In an aviation landing field, a landing surface comprising a plurality of resiliently yieldably supported sections forming said field so as to be individually movable relatively to one another, and connecting means between said sections to limit the vertical movement of each section relatively to adjacent sections.

8. In an aviation air field, a chamber in the ground, a covering for the chamber at about the level of the field being made of material adapted to transmit light, said cover being made of independently movable sections, means to connect said sections for limiting the independent movement of each individual section relatively to the other sections to a predetermined stroke, sources of light in said chamber to direct rays of light to said covering, and means in the chamber to yieldably support said covering in position to form a landing surface with depressible sections.

9. A covering for an aviation air field, comprising a plurality of sections forming said covering, means to connect said sections to each other with freedom of limited individual movement with respect to one another, and means to yieldably support said sections at about the level of the landing surface, said connecting means transmitting movement from a section to an adjacent section when the movement of the first section by an aircraft exceeds said limited movement.

10. In a landing surface for an aviation air field, comprising surface sections having a plurality of concave indentations of such relative size as to exert a suction effect on the tires of the landing gear of an aircraft, each of said sections being depressible by the weight of a landing aircraft individually and separately of the other sections.

11. In a landing field, a plurality of sections forming a landing surface of the landing field, bumper members projecting at the meeting edges of adjacent sections to above the level of the landing surface, means to resiliently support said sections relatively to each other so as to vary the relative degree of protrusion of said bumper members according to the displacement of a section by depressing force exerted thereon, and means of connection between adjacent sections to limit the independent movement of one section relatively to the other.

12. A landing surface for an aviation landing field, comprising a plurality of separate surface sections, means to support the sections so that each section is movable vertically with respect to the other, means to limit said relative movement of the respective sections, and aircraft retarding elements projected from each of said sections so that the height of the retarding elements relatively to the adjacent section varies according to the relative position of the respective sections.

13. In an aviation landing field, a plurality of separate sections forming the landing surface, means to yieldably support said sections, said sections being so connected to each other as to permit the separate depression of a section by the weight of a landing aircraft thereby to move said section relatively to the adjacent sections, and coacting means on adjacent sections to depress the next section when the first section is moved to a predetermined extent.

14. In an aviation landing field, a plurality of separate sections forming the landing surface, means to yieldably support said sections, means to connect said sections to each other, so as to permit the depression of a section by the weight of a landing aircraft and the movement of said section separately with respect to the adjacent sections, a lateral projection on each section, each adjacent section having an abutment recess thereon opposite said projection in which said projection is movable from one end of the recess to the opposite end of said recess after a separate section is moved to the extent of said abutment recess for moving the adjacent sections together beyond said stroke.

15. In an aviation landing field, a plurality of separate sections forming the landing surface, means to yieldably support said sections, means to connect said sections to each other so as to permit the depression of a section by the weight of a landing aircraft thereby to move said section relatively to the adjacent sections, border frame members on each section, and coacting abutments between adjacent border frame members of adjacent sections to limit the independent movement of each section relatively to the next section.

EULALIA C. HENDERSON.
GEORGE STALLARD.